(12) United States Patent
Jeong

(10) Patent No.: US 7,715,120 B2
(45) Date of Patent: May 11, 2010

(54) LENS MODULE AND CAMERA MODULE

(75) Inventor: Hye Jung Jeong, Anyang-si (KR)

(73) Assignee: LG Innotek Co., Ltd., Seoul (KR)

( * ) Notice: Subject to any disclaimer, the term of this patent is extended or adjusted under 35 U.S.C. 154(b) by 109 days.

(21) Appl. No.: 11/913,299

(22) PCT Filed: Apr. 13, 2007

(86) PCT No.: PCT/KR2007/001799

§ 371 (c)(1),
(2), (4) Date: Oct. 31, 2007

(87) PCT Pub. No.: WO2007/119971

PCT Pub. Date: Oct. 25, 2007

(65) Prior Publication Data

US 2008/0170302 A1 Jul. 17, 2008

(30) Foreign Application Priority Data

Apr. 14, 2006 (KR) ...................... 10-2006-0033829

(51) Int. Cl.
*G02B 9/12* (2006.01)
*G02B 13/18* (2006.01)
(52) U.S. Cl. ..................... 359/784; 359/716; 359/754

(58) Field of Classification Search .................. 359/715, 359/716, 784, 708; G02B 13/18, 3/02, 3/06
See application file for complete search history.

(56) References Cited

U.S. PATENT DOCUMENTS

| 5,493,449 | A  | * | 2/1996 | Yamakawa | ................... 359/775 |
| 7,184,225 | B1 | * | 2/2007 | Noda | .......................... 359/784 |
| 2008/0062536 | A1 | * | 3/2008 | Chen et al. | ................... 359/708 |

FOREIGN PATENT DOCUMENTS

| JP | 2005-227755 | 8/2005 |
| JP | 2005-292235 | 10/2005 |
| JP | 2005-326682 | 11/2005 |

\* cited by examiner

*Primary Examiner*—Darryl J Collins
*Assistant Examiner*—Zachary Wilkes
(74) *Attorney, Agent, or Firm*—Saliwanchik, Lloyd & Saliwanchik

(57) ABSTRACT

Provided is a camera module. The camera module includes an aperture stop, a first lens, a second lens, a third lens, and an image sensor. The first lens has a positive refractive power to transmit light that has passes through the aperture stop, and the second lens has a negative refractive power to transmit light that has passed through the first lens. The third lens has a negative refractive power to transmit light that has passed through the second lens. The image sensor detects light that has passed through the third lens.

18 Claims, 4 Drawing Sheets

[Fig. 1]
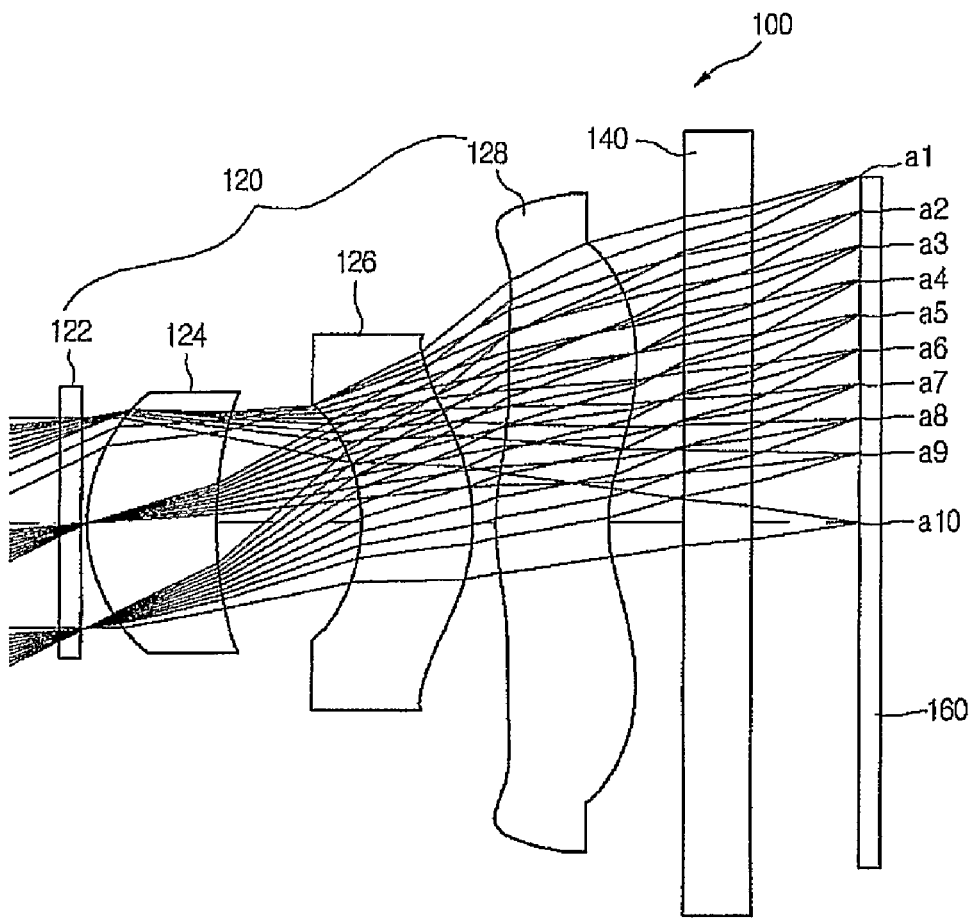
[Fig. 2]
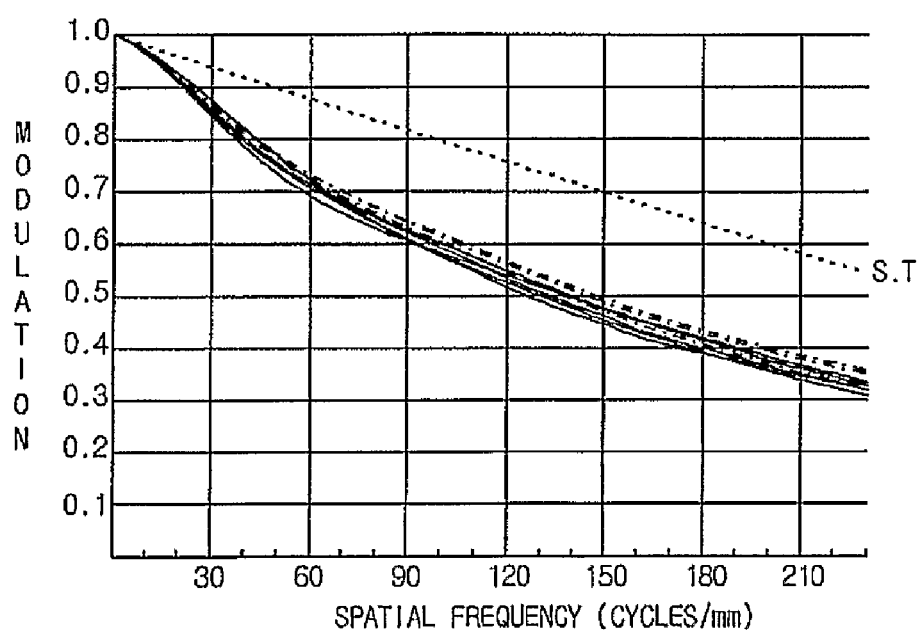

[Fig. 3]
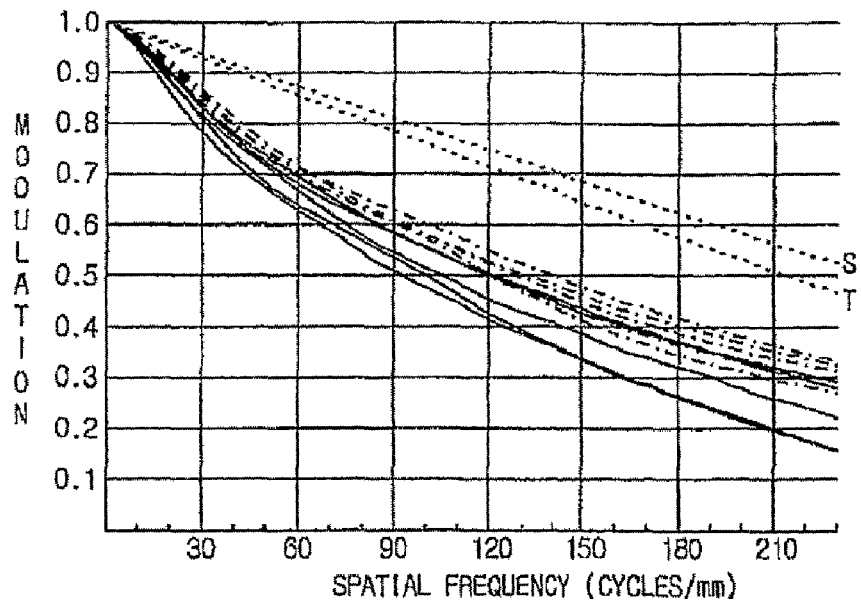
[Fig. 4]
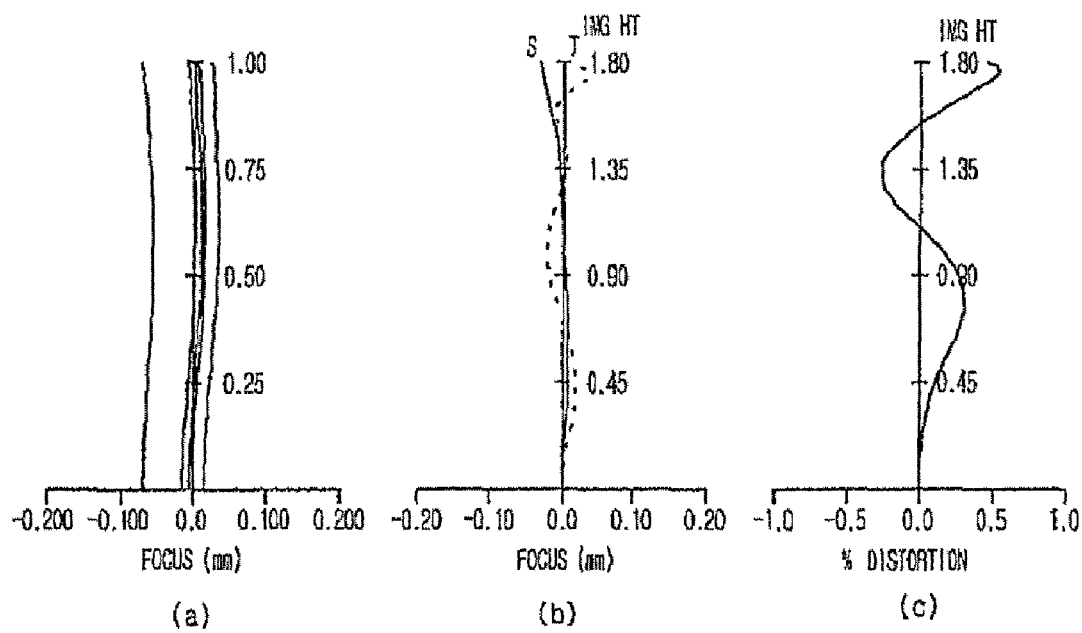

[Fig. 5]
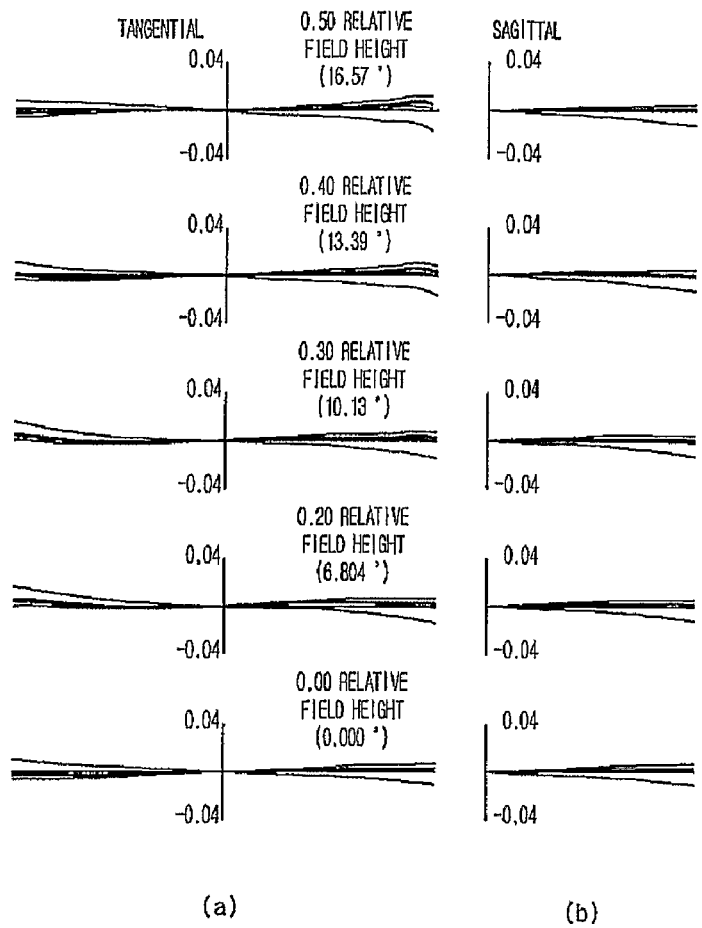
(a)　　　　　　　　(b)
[Fig. 6]
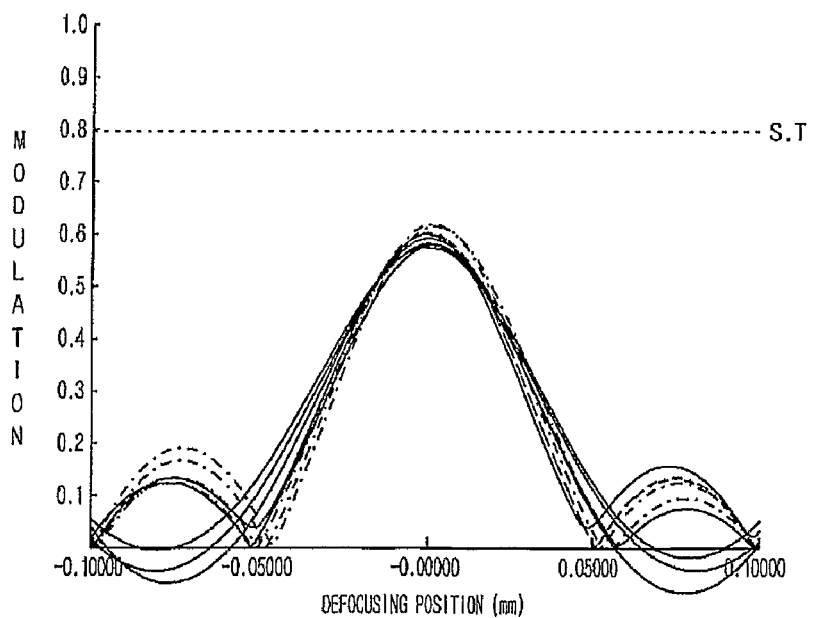

[Fig. 7]
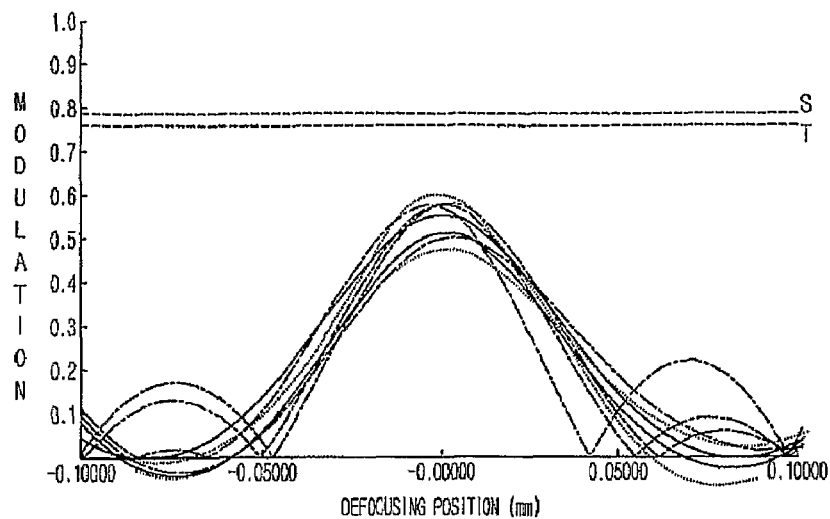
[Fig. 8]
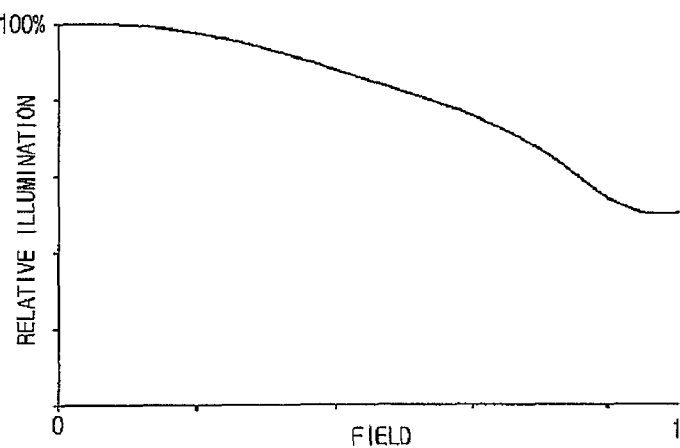
[Fig. 9]
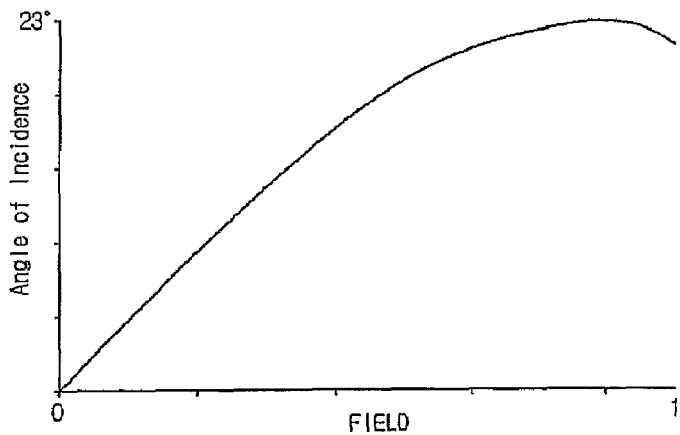

LENS MODULE AND CAMERA MODULE

CROSS-REFERENCE TO RELATED APPLICATION

This application is the U.S. national stage application of international Patent Application No. PCT/KR2007/001799, filed Apr. 13, 2007, the disclosure of which is hereby incorporated by reference in its entirety.

TECHNICAL FIELD

The present invention relates to a lens module and a camera module.

BACKGROUND ART

Recently, a subminiature camera using a charge coupled device (CCD) or a complementary metal oxide semiconductor (CMOS) sensor is mounted in mobile apparatuses such as cellular phones, personal digital assistants (PDAs), smart phones, MP3 players, electronic dictionaries.

A camera applied to the mobile apparatuses should be miniaturized and lightweight, and realize high resolution with low costs.

DISCLOSURE OF INVENTION

Technical Problem

Embodiments provide a high resolution lens module and camera module.

Embodiments provide a lens module and a camera module that minimize an optical full length and a chief ray angle (CRA).

Technical Solution

An embodiment provides a camera module comprising: an aperture stop; a first lens having a positive refractive power to transmit light that has passed through the aperture stop; a second lens having a negative refractive power to transmit light that has passed through the first lens; a third lens having a negative refractive power to transmit light that has passed through the second lens; and an image sensor for detecting light that has passed through the third lens.

An embodiment provides a lens module comprising, sequentially from an object side: an aperture stop, a first lens having a positive refractive power, a second lens having a negative refractive power, and a third lens having a negative refractive power, wherein an optical full length of 2.5-3.38 mm is provided, and a relation of $0.5<TL/f<1.5$ is satisfied.

ADVANTAGEOUS EFFECTS

Embodiments can provide a lens module and a camera module having excellent optical characteristics of high resolution with low costs.

BRIEF DESCRIPTION OF THE DRAWINGS

FIG. 1 is a view illustrating arrangement of optical parts of a camera module according to an embodiment;

FIGS. 2 and 3 are graphs illustrating modulation transfer function (MTF) of a camera module according to an embodiment;

FIG. 4 is a graph illustrating lens aberration of a camera module according to an embodiment;

FIG. 5 is a graph illustrating optical aberration of a lens module of a camera module with respect to 0 field to 0.5 field according to an embodiment;

FIGS. 6 and 7 are graphs illustrating through focus of a camera module according to an embodiment;

FIG. 8 is a graph illustrating a relative amount of light depending on a field of a camera module according to an embodiment; and FIG. 9 is a graph illustrating a CRA depending on a field of a camera module according to an embodiment.

MODE FOR THE INVENTION

A lens module and a camera module according to embodiments will be descried with the accompanying drawings.

FIG. 1 is a view illustrating arrangement of optical parts of a camera module according to an embodiment. The sizes, shapes, and intervals of optical parts are exaggerated or briefly illustrated for convenience in explanation in the embodiment of FIG. 1.

Referring to FIG. 1, the camera module 100 according to the embodiment includes a lens module 120, an infrared blocking filter 140, and an image sensor 160.

The lens module 120 includes a lens system having an aperture stop 122, a first lens 124, a second lens 126, and a third lens 128.

The aperture slop 122 controls an amount of light incident onto the image sensor 160 through the lens system. An F-number of the aperture stop 122 can be greater than 2.8.

Each of the first to third lenses 124, 126, and 128 are formed using an aspherical lens where aberration is easily corrected.

In an embodiment, the aperture stop 122 is located on a front side in an object side of the first lens 124. As the aperture stop 122 is disposed at a foremost side, a CRA reduces to increase efficiency of the image sensor 160, and an optical full length is minimized.

The CRA means an angle at which light is incident onto the image sensor 160 or a microlens formed on the image sensor 160. As the CRA is small, an amount of light incident onto the image sensor 160 increases, and efficiency of the image sensor 160 increases.

Meanwhile, in the case where the aperture stop 122 is located at a front side in an object side compared to the lenses 124, 126, and 128, a distortion degree of light may increase.

However, in an embodiment, the first lens 124 having positive (+) refractive power, the second lens 126 having negative (−) refractive power, and the third lens 128 having a negative (−) refractive power are formed using an aspherical lens to reduce a distortion degree of light.

The first lens 124 has an object side formed in a convex surface, and an image side formed in a concave surface. The second lens 126 has an object side formed in a concave surface, and an image side formed in a convex surface. Also, the third lens 128 is formed in a meniscus shape in which an object side is formed in a convex surface, and an image side is formed in a concave surface.

Here, the object side means a direction in which an object is located, and the image side means a direction in which light incident from the object side passes through the lens module 120 and is formed as an image, that is, a direction in which the image sensor 160 is located.

The first lens 124 refracts light that has passed through the aperture stop 122 using positive (+) refractive power, and has an object side formed in a convex surface to secure a wide viewing angle and a sufficient back focus length.

The second lens 126 has both surfaces formed in an aspherical surface so that spherical aberration and coma aberration of incident light are corrected.

The third lens 128 has both surfaces formed in an aspherical surface so that distortion and spherical aberration of incident light are corrected.

The lenses 124, 126, and 128 can be formed of glass or plastics.

The lens module 120 according to an embodiment can be minimized in its size without increasing the third lens 128 to a large caliber.

The camera module according to an embodiment has optical characteristics illustrated in Table 1.

TABLE 1

|  | Curvature radius | Center interval | Refractive index |
|---|---|---|---|
| surface of aperture 122 | 0 | 0 |  |
| Object side of first lens 124 | 1.0023 | 0.57 | 1.532 |
| Image side of first lens 124 | 3.0540 | 0.64 |  |
| Object side of second lens 126 | −1.0067 | 0.48 | 1.532 |
| Image side of second lens 126 | −1.1908 | 0.1 |  |
| Object side of third lens 128 | 1.5853 | 0.5 | 1.532 |
| Image side of third lens 128 | 1.0387 | 0.33 |  |
| Object side of filter 140 | 0 | 0.3 |  |
| Image side of filter 140 | 0 | 0.47 |  |

The first to third lenses 124, 126, and 128 can be formed of a material having a refractive index of 1.45-1.55.

Also, the lens module 120 can be formed to have an optical full length in the range of 2.5-3.38 mm.

In an embodiment, the lens module 120 has an optical full length of 3.38 mm, and an effective focal length of 3.04 mm. An angle of view of the lens module 120 can be 61.2° or more.

The lens module 120 according to an embodiment satisfies the following condition.

(condition 1) $0.5 < f1/f < 1.5$, where f1 is the focal length of the first lens 124, and f is the effective focal length an entire optical system.

The condition 1 defines the power of the first lens 124. When the value of f1 increases such that f1/f has a value of an upper limit or more, the powers of the second lens 126 and the third lens 128 should increase, which increases chromatic aberration.

Also, when the value of f1 decreases such that f1/f has a value of a lower limit or less, the power of the first lens 124 increases excessively, so that spherical aberration and coma aberration increase, high resolution is difficult to satisfy, and the curvature radius of a lens surface of the first lens 124 decreases, which makes processing a lens difficult.

(condition 2) $0.5 < TL/f < 1.5$, where TL is an optical full length.

The condition 2 defines measures of an entire optical system, and is a condition for miniaturization. When TL/f has a value of an upper limit or more, an aberration correcting characteristic becomes excellent, but the size of the optical system increases. On the other hand, when TL/f has a value of a lower limit or less, an optical characteristic cannot be satisfied.

The aspherical surface of each lens of the lens module 120 according to an embodiment is obtained using Equation 1 below.

$$Z = \frac{\frac{H^2}{r}}{1 + \sqrt{1 - (K+1)\left(\frac{H}{r}\right)^2}} + AH^4 + BH^6 + CH^8 + DH^{10} \quad \text{Equation 1}$$

where Z: distance toward optical axis from vertex of lens

H: distance toward direction perpendicular to optical axis r: curvature radius at vertex of lens K: conic constant A, B, C, and D: aspherical coefficients Aspherical coefficients are given by Table 2 using Equation 1 in an embodiment.

TABLE 2

| surface number | K | A | B | C | D |
|---|---|---|---|---|---|
| 2 | 0.6147310 | −0.0638442 | 0.1184390 | −1.6242300 | 7.4077200 |
| 3 | 6.5354380 | 0.0494977 | 0.3184560 | −3.6368700 | 16.8310000 |
| 4 | −1.0030080 | 0.2272890 | −1.6050000 | 8.1985200 | −42.2406000 |
| 5 | −0.0867210 | 0.1587520 | −0.1510120 | 0.5652020 | −0.1154430 |
| 6 | −5.8818440 | −0.2433950 | 0.1718270 | −0.0040608 | −0.0439271 |
| 7 | −6.2354640 | −0.1531920 | 0.0327074 | 0.0055788 | −0.0053497 |

In Table 2, surface number 2 is the object side of the first lens 124, surface number 3 is the image side of the first lens 124, surface number 4 is the object side of the second lens 126, surface number 5 is the image side of the second lens 126, surface number 6 is the object side of the third lens 128, and surface number 7 is the image side of the third lens 128.

Meanwhile, the infrared blocking filter 140 can be located between the third lens 128 and the image sensor 160.

The image sensor 160 converts light that has passed through the third lens 128 into a digital signal. Examples of the image sensor 160 include charge coupled devices (CCDs) and complementary metal oxide semiconductor (CMOS) sensors.

The infrared blocking filter 140 blocks radiant heat so that radiant heat emitted from external light is not delivered to the image sensor 160. That is, the infrared blocking filter 140 transmits a visible ray and reflects an infrared having a wavelength of about 650 nm so that the infrared is emitted to the outside.

Also, the image sensor 160 can be connected to a circuit such as a correlated double sampling hold & auto gain control (CDS/AGC) circuit. The CDS/AGC circuit removes a noise component of an electrical signal output from the image sensor 160 to extract only a pure signal component, and compensates for the gain of a signal component that has been lost during the extracting process to output an optimum image signal.

Here, with the construction of the first, second, and third lenses 124, 126, and 128, a CRA, which is an angle at which light is incident onto the image sensor 160 can have a numeral value of 25° or less.

Occurrence of shading at the surrounding of an image formed on the image sensor can be suppressed by controlling the CRA.

An optical characteristic of the camera module 100 will be described according to an embodiment with reference to the accompanying drawings.

FIGS. 2 and 3 are graphs illustrating modulation transfer function (MTF) characteristics of a camera module 100 according to an embodiment.

For reference, regarding the MTF, light departing from two adjacent points on the surface of an object passes through the lens, experiences deformation, and overlaps more or less on an image forming surface. At this point, modulation is a numerical value representing an overlapping degree.

Comparison of modulation for an object with modulation at an image forming surface shows that exactness with which a lens delivers an image of an object onto an image forming surface. A ratio of modulation of an image forming surface to modulation of an object is defined as an MTF.

Therefore, ideally, the MTF has a value of 1, but an actual lens has a value less than 1 due to various factors.

FIG. 2 illustrates MTF characteristics at a 0 field to a 0.5 field (a10 to a6 in FIG. 1).

FIG. 3 illustrates MTF characteristics at a 0.6 field to a 1 field (a5 to a1 in FIG. 1).

S is sagittal and T is tangential in FIGS. 2 and 3. A dotted line denotes reference values in sagittal and tangential directions. Referring to FIG. 2, two dotted lines overlap each other.

Also, the dotted line in FIGS. 2 and 3 denotes MTF characteristics for ten fields on a sagittal direction, and a curve of a solid line denotes MTF characteristics for ten fields on a tangential direction.

The MTF depends on a special frequency having a unit of cycles/mm. Referring to FIGS. 2 and 3, the MTF in the range of 150 cycles/mm in a 0 field to a 1 field has a value of 0.3 or more, showing an excellent optical characteristic.

FIG. 4 is a graph illustrating lens aberration of a camera module according to an embodiment.

FIG. 4(*a*) is a view measuring longitudinal spherical aberration, FIG. 4(*b*) is a view measuring astigmatic field curvature, and FIG. 4(*c*) is a view measuring distortion aberration.

Referring to FIG. 4, a Y axis means the size of an image, and an X axis means a focal length. When the graphs showing experimental values approach a central line (0,0), it is considered that an aberration correction function is excellent.

Referring to FIG. 4, longitudinal spherical aberration, astigmatic field curvature, and distortion aberration have excellent values of within ±0.1 mm, ±0.05 mm, ±0.25% distortion, respectively. Since high resolution is realized using these values, a sub-miniature lens module for a mobile handset can be manufactured in a very small size, and a high performance function can be realized.

FIG. 5 is a graph illustrating optical aberration of a lens module of a camera module with respect to 0 field to 0.5 field (a10 to a6 in FIG. 1) according to an embodiment.

As described above, five graphs measured in FIG. 5 illustrate tangential aberration (FIG. 5(*a*)) and sagittal aberration (FIG. 5(*b*)), respectively, measured on five image regions from a center on the image sensor 160.

Referring to FIG. 5, when lines of respective experiment values approach an X axis, it is considered that an optical aberration correcting function is excellent. Examination of FIG. 5 shows that measurement graphs for each field almost approach an X axis.

FIGS. 6 and 7 are graphs illustrating a through focus of the camera module 100 according to an embodiment.

FIG. 6 is a graph illustrating a 0 field to a 0.5 field, and FIG. 7 is a graph illustrating a 0.6 field to a 1 field.

FIGS. 6 and 7 illustrate a through focus value serving as a reference on the assumption that a parabola-shaped solid line having a maximum and a minimum has resolution of 100 line pairs. When a measurement graph for each field approaches the parabola-shaped solid line, it can be considered that the field has an excellent through focus value.

In FIGS. 6 and 7, a dotted line denotes reference values in the case where aberrations in a sagittal direction and a tangential direction are zero.

Referring to FIGS. 6 and 7, excellent characteristics are observed at defocusing positions of ±0.3 mm and modulation of 0.3 or more.

FIG. 8 is a graph illustrating a relative amount of light depending on a field of the camera module 100 according to an embodiment, and FIG. 9 is a graph illustrating a CRA depending on a field of the camera module 100 according to an embodiment.

In the graphs shown in FIGS. 8 and 9, illumination for each field and a CRA have been measured as follows.

TABLE 3

| Field | Relative Illumination value |
|---|---|
| 0.0F | 100.00 |
| 0.2F | 98.10 |
| 0.3F | 94.70 |
| 0.4F | 89.90 |
| 0.5F | 84.60 |
| 0.6F | 79.40 |
| 0.7F | 72.90 |
| 0.8F | 63.80 |
| 0.9F | 52.70 |
| 1.0F | 50.20 |

TABLE 4

| Field | Image Height | Angle of Incidence |
|---|---|---|
| 0.0F | 0.00 | 0.0 |
| 0.2F | 0.36 | 8.53986 |
| 0.3F | 0.54 | 12.56244 |
| 0.4F | 0.72 | 16.28874 |
| 0.5F | 0.90 | 19.52374 |
| 0.6F | 1.09 | 21.99674 |
| 0.7F | 1.27 | 23.57616 |
| 0.8F | 1.45 | 24.50000 |
| 0.9F | 1.63 | 24.89290 |
| 1.0F | 1.80 | 23.29875 |

Referring to FIG. 8, Tables 3 and 4, illumination of a 1.0 field has a value of 50% at the minimum of the illumination of a 0 field. The CRA of the 1.0 field has a range within 25%.

Therefore, it can be considered that the aberration correcting performance of the lens module 120 according to an embodiment is excellent.

INDUSTRIAL APPLICABILITY

Embodiments can be applied to a camera module.

The invention claimed is:

1. A camera module comprising:
an aperture stop;
a first lens having a positive refractive power to transmit light that has passed through the aperture stop;
a second lens having a negative refractive power to transmit light that has passed through the first lens;
a third lens having a negative refractive power to transmit light that has passed through the second lens; and
an image sensor For detecting light that has passed through the third lens,
wherein an optical full length is in a range of 2.5-3.38 mm, wherein the first lens has an object side having a convex surface, and an image side having a concave surface.

2. The camera module according to claim 1, wherein the second lens has an object side having a concave surface, and an image side having a convex surface.

3. The camera module according to claim 1, wherein the third lens is formed in a meniscus shape in which an object side has a convex surface, and an image side has a concave surface.

4. The camera module according to claim 1, wherein at least one of the first, second, and third lenses comprises an aspherical lens.

5. The camera module according to claim 1, wherein an F-number of the aperture stop is 2.8 or more.

6. The camera module according to claim 1, wherein at least one of the first, second, and third lenses is formed of a material having a refractive index of 1.45-1.55.

7. The camera module according to claim 1, wherein a condition of $0.5<f1/f<1.5$ is satisfied, where f1 is a focal length of the first lens, and f is an effective focal length of an entire optical system.

8. The camera module according to claim 1, wherein a condition of $0.5<TL/f<1.5$ is satisfied, where it is an optical full length, and f is an effective focal length of an entire optical system.

9. The camera module according to claim 1, further comprising an infrared blocking filter between the third lens and the image sensor.

10. The camera module according to claim 1, wherein a chief ray angle is 25° or less.

11. A lens module comprising:
an aperture stop,
a first lens having a positive refractive power,
a second lens having a negative refractive power, and
a third lens having a negative refractive power,
wherein a optical full length of 2.5-3.38 is provided, and a condition of $0.5<TL/f<1.5$ is satisfied, where it is a optical full length, ad f is a effective focal length of a entire optical system.

12. The lens module according to claim 11, wherein a condition of $0.5<f1/f<1.5$ is satisfied, where f1 is a focal length of the first lens, ad f is a effective focal length of an entire optical system.

13. The lens module according to claim 11, wherein the first lens has a object side having a convex surface, ad a image side having a concave surface.

14. The lens module according to claim 11, wherein the second lens has a object side having a concave surface, and an image side having a convex surface.

15. The lens module according to claim 11, wherein the third lens is formed in a meniscus shape in which a object side has a convex surface, ad an image side has a concave surface.

16. The lens module according to claim 11, wherein at least one of the first, second, ad third lenses comprises a aspherical lens.

17. The lens module according to claim 11, wherein at least one of the first, second, and third lenses is formed of a material having a refractive index of 1.45-1.55.

18. The lens module according to claim 11, wherein a chief ray angle is 25° or less.

* * * * *